United States Patent [19]

Brinkmann et al.

[11] 4,018,746

[45] Apr. 19, 1977

[54] TRANSPARENT COPOLYAMIDES FROM M-XYLYLENE DIAMINE, AN ALIPHATIC DIAMINE AND TEREPHTHALIC ACID

[75] Inventors: Ludwig Brinkmann, Frankfurt am Main; Walter Herwig, Neuenhain, Taunus, both of Germany

[73] Assignee: Hoechst Aktiengesellschaft, Frankfurt am Main, Germany

[22] Filed: Mar. 26, 1976

[21] Appl. No.: 670,716

Related U.S. Application Data

[63] Continuation-in-part of Ser. No. 515,658, Oct. 17, 1974, abandoned, which is a continuation-in-part of Ser. No. 347,142, April 2, 1973, abandoned.

[30] Foreign Application Priority Data

Apr. 5, 1972   Germany .......................... 2216261

[52] U.S. Cl. .......................... 260/78 R; 260/33.4 R
[51] Int. Cl.² ................. C08G 69/26; C08G 69/32
[58] Field of Search ................................. 260/78 R

[56] References Cited

UNITED STATES PATENTS

| | | |
|---|---|---|
| 3,376,270 | 4/1968 | Ridgway .......................... 260/78 R |
| 3,426,001 | 2/1969 | Ridgway .......................... 260/78 R |
| 3,645,983 | 2/1972 | Ridgway .......................... 260/78 R |

*Primary Examiner*—Harold D. Anderson
*Attorney, Agent, or Firm*—Curtis, Morris & Safford

[57] ABSTRACT

There are disclosed and claimed novel polyamides showing transparency and other excellent properties, and the process for making them. The polyamides of the invention are prepared in the known manner and under common conditions by poly-condensing meta-xylylene diamine, which may optionally be partially substituted by para-xylylene diamine, at least one straight chain aliphatic diamine, at least one unsubstituted aromatic dicarboxylic acid and at least one aliphatic saturated dicarboxylic acid.

9 Claims, No Drawings

TRANSPARENT COPOLYAMIDES FROM M-XYLYLENE DIAMINE, AN ALIPHATIC DIAMINE AND TEREPHTHALIC ACID

This is a continuation-in-part of our application, Ser. No. 515,658, filed Oct. 17, 1974, which is a continuation-in-part of our application, Ser. No. 347,142 filed Apr. 2, 1973, both now abandoned.

Polyamides prepared from aliphatic diamines and aliphatic dicarboxylic acids have been known for decades. According to their composition, these polyamides are ether crystalline substances having a high melting point, or amorphous substances having a relatively low second order transition temperature. The crystalline aliphatic polyamides are used in injection moulding. The amorphous aliphatic polyamides are suitable for the manufacture of sheets, strips, plates, tubes and injection moulded articles. However, because of their low second order transition temperatures, they can be used only at low temperatures which, of course, greatly limits their usefulness.

Polyamides prepared from meta-xylylene diamine or mixtures of metaxylylene diamine and para-xylylene diamine with dicarboxylic acids have been described in a number of patent specifications. The polyamides described are crystalline in many cases and can be processed into filaments. Amorphous, transparent polyamides can be prepared from meta-xylene diamine with pimelic acid or azelaic acid. However, these polyamides have the disadvantage that their second order transition temperature is, in general, below 100° C; shaped articles prepared from these polyamides cannot, therefore, be used at high temperatures.

U.S. Pat. No. 2,766,222 discloses that meta-xylylene diamine forms transparent polyamides with isophthalic acid and also with mixtures of isophthalic acid and terephthalic acid. However, these polyamides have only a slight impact strength, which prevents their use in many fields of application.

U.S. Pat. No. 3,426,001 discloses polyamides made with a mononuclear aromatic dicarboxylic acid which is tert.-butyl-substituted. Such polyamides, however, show a very poor form stability at an elevated temperature.

The present invention provides a process for the preparation of transparent polyamides by polycondensation of diamines and dicarboxylic acids or their acid halides, esters, nitriles or amides in known manner and under the usual conditions wherein a. a mixture of
  ($\alpha$) 50 to 100 mol %, preferably 65 to 100 mol % of meta-xylylene diamine and 50 to 0 mol %, preferably 35 to 0 mol %, of paraxylylene diamine, calculated on the sum of the xylylene diamine components, and
  ($\beta$) at least one straight chain aliphatic diamine containing 4 to 20 carbon atoms, preferably 6 to 12 carbon atoms, the proportion of aliphatic diamine(s) amounting to from 5 to 90 mol %, preferably from 15 to 50 mol %, calculated on the sum of the diamine components ($\alpha$) and ($\beta$), and
b. a mixture of at least one unsubstituted aromatic dicarboxylic acid selected from the group consisting of unsubstituted terephthalic acid and unsubstituted isophthalic acid, and least one aliphatic saturated dicarboxylic acid advantageously containing from 5 to 20 carbon atoms, preferably from 6 to 12 carbon atoms, the proportion of the aliphatic dicarboxylic acid or acids amounting to from 10 to 90 mol %, preferably from 30 to 70 mol % of the total acid mixture, or a mixture of the corresponding dicarboxylic acid derivatives, are used.

The meta-xylylene diamine and para-xylene diamine necessary for the preparation of the polyamides according to the invention can be obtained by hydrogenation of isophthalic acid dinitrile or terephthalic acid dinitrile.

As straight chain aliphatic diamines suitable for the invention can be used for example: tetramethylene diamine, pentamethylene diamine, octamethylene diamine, or dodecamethylene diamine. Also mixtures of straight chain diamines can be used. Hexamethylene diamine is especially preferred.

Suitable aromatic dicarboxylic acids which can be used according to the invention are unsubstituted isophthalic acid, unsubstituted terephthalic acid or mixtures of unsubstituted isophthalic acid and therephthalic acid.

Suitable aliphatic dicarboxylic acids which can be used according to the invention are those having from 5 to 20 carbon atoms, preferably from 6 to 12 carbon atoms, especially adipic acid. Further advantageous examples of aliphatic dicarboxylic acids suitable for use in accordance with the present invention are 2-methyl-glutaric acid, pimelic acid, suberic acid, azelaic acid, sebacic acid and 1,10-decane-dicarboxylic acid.

Mixtures of any of the above-mentioned aliphatic dicarboxylic acids may also be used.

The polyamides of the invention may be prepared in accordance with the known processes that have been developed for the preparation of polyhexamethylene adipamide. The diamines and dicarboxylic acids are put in an autoclave made of stainless steel, optionally with the addition of water and/or acetic acid.

It is sometimes expedient to prepare the salts of the diamines and dicarboxylic acids beforehand. The components are heated optionally in a nitrogen current while stirring, to a temperature within the range of from about 200° to 250° C. Then, the stream is let off, and the temperature is increased to about 260° to 300° C. At this temperature the mixture is stirred for about 30 minutes in a nitrogen current. Finally, optionally in the vacuum, condensation is continued until the polyamide has attained the desired molecular weight.

It was surprisingly that the polyamides of the invention can be melted to a clear melt and can be worked into transparent shaped articles. It is a special advantage that for the preparation of the polyamides cheap monomers can be used, which are technically prepared in large quantities, as, for example, hexamethylene diamine and adipic acid.

It is often advantageous to use a surplus of up to 5% by weight, preferably from 0.5 to 2% by weight, of xylylene diamines(s) and of aliphatic diamine(s) as compared to the dicarboxylic acids in order to compensate for distillation losses of diamines during polycondensation.

In the preparation of the polyamides instead of the dicarboxylic acid their amide-forming derivatives such as dicarboxylic acid halides, esters, nitriles or amides can also be used.

Polyamides with especially high molecular weights and good mechanical properties are obtained when the polyamides prepared in the autoclave furnished with a stirrer are further condensed, preferably in a double-screw extruder under reduced pressure.

The polyamides of the invention, which correspond to the general formula

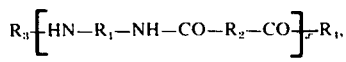

wherein $R_1$ represents a meta-xylylene radical, randomly distributed over the macromolecule with from 0 to 50 mol %, preferably from 0 to 35 mol % of this radical being replaced by a para-xylylene radical, and at least one, straight chain, bivalent aliphatic hydrocarbon radical, likewise randomly distributed over the macromolecule, and containing from 4 to 20 carbon atoms, preferably from 6 to 12 carbon atoms, the proportion of the aliphatic hydrocarbon radical or aliphatic hydrocarbon radicals being within the range of from 5 to 90 mol %, preferably 15 to 50 mol %, calculated on the sum of the xylylene radical(s) and aliphatic hydrocarbon radical(s), $R_2$ represents at least one phenylene unit selected from p—$C_6H_4$—, m—$C_6H_4$—, and mixtures thereof randomly distributed over the macromolecule, and at least one bivalent aliphatic saturated hydrocarbon radical likewise randomly distributed over the macromolecule and advantageously containing from 3 to 18 carbon atoms, preferably from 4 to 10 carbon atoms, the proportion of the aliphatic radical(s) being within the range of from 10 to 90 mol %, preferably from 30 to 70 mol %, calculated on the sum of the aromatic and aliphatic radicals, $R_3$ represents H or OC—$R_2$—COOH and $R_4$ represents OH or NH—$R_1$—$NH_2$, and in which $x$ indicates the degree of polymerization, measured as reduced specific viscosity within the range of from 1.0 to 2.5 dl/g, preferably from 1.5 to 2.0 dl/g, determined in a solution of 1 g of the polyamide in 100 ml of a mixture of phenol/tetrachloroethane (in a weight ratio of 60:40) at 25° C, are distinguished by a high degree of transparency, a good impact strength and good dielectric properties and lend themselves readily to being processed by injection moulding. In general, they have second order transition temperatures of above 100° C and they are especially suitable for the manufacture of injection-moulded articles that may also be used at higher temperatures. Some of the polyamides according to the invention, especially those that contain para-xylylene diamine in combination with terephthalic acid, may crystallize when heated for a sufficient length of time at temperatures above the second order transition temperature and are then opaque, but they can nevertheless be injection-moulded to form transparent articles, if injected into a sufficiently cooled mould.

Especially good polyamides are those of the formula indicated in which $R_1$ represent a m—$CH_2$—$C_6H_4$—$CH_2$— (meta-xylylene-)-radical, which is optionally replaced partly by a paraxylylene radical, and a —$(CH_2)_6$—radical and $R_2$ represents a p—$C_6H_4$— and/or m—$C_6H_4$— and a —$(Ch_2)_4$—radical, these radicals being distributed randomly over the macromolecule.

Moulded articles prepared from the polyamides of the present invention are transparent and possess good dielectric properties. Because of the high second order transition temperatures the moulded articles can be used at relatively high temperatures without losing their good mechanical properties. They have a high ball indentation hardness together with a good impact strength.

It has been further found that the present copolyamides have improved form stability, e.g., deflection resistance, at elevated temperatures. More particularly, as shown by comparison Examples 4a through 4c below, it has been found that by using unsubstituted aromatic dicarboxylic acids selected from unsubstituted terephthalic and isophthalic acid instead of the tert.-butyl-substituted dicarboxylic acids of U.S. Pat. No. 3,426,001 a substantial and unexpected improvement in form stability is achieved.

The polyamides of the present invention can be used in all cases where transparency and good mechanical properties at high temperatures are necessary. They can be processed into sheets, plates, tubes, wire coverings and, especially advantageously, by injection moulding, into technical parts.

The following examples illustrate the invention.

EXAMPLES

The viscosity measurements were carried out with solutions of 1 gram of polyamide in 100 ml of phenol-tetra-chloroethane (in a weight ratio of 60:40) at 25° C. The second order transition temperatures were determined by differential thermoanalysis at a heating speed of 4° to C/min.

EXAMPLE 1

From 166.0 g of terephthalic acid, 73.7 g of adipic acid, 139.0 g of meta-xylylene diamine and 59.2 g of hexamethylene diamine a salt mixture was prepared by mixing the components. The salt mixture was introduced into a glass flask which was fitted with an agitator and a distillation bridge. The salts were heated up to 275° C in the course of 1½ hours in a nitrogen stream. The mixture was stirred for 1 hour in the nitrogen stream at this temperature. The polyamide obtained was a transparent, light yellow coloured substance with a reduced specific viscosity of 1.8 dl/g. The second order transition temperature of the product was 118° C. Four further polyamide samples were prepared in the same manner. The resulting polyamide samples were reduced to small pieces and subsequently mixed. 1.7 kg of polyamide with a mean reduced specific viscosity of 1.82 dl/g were obtained.

Plates, measuring 60 × 60 × 2 mm, made of this material were produced on an injection moulding machine. The screw temperature was 295° C and the temperature of the mould 60° C.

The impact strength of the plates was tested by a fall test. Each plate was placed on a rigid-support having a circular bore (diameter: 2.6 cm) in such a way that the centre of the plate is above the bore. A falling body (weight: 940 g) carrying a steel ball (diameter: 0.9 cm) at its lower end was dropped from various heights vertically and concentric to the bore onto the plate. As a measure of the impact strength there was determined the "mean falling height" in cm which denotes the mean height from which the falling body must fall onto the examined plates in order to cause 20% of the plates to break. The tests were carried out after the injection-moulded plates had been stored for 5 days in air at 20° C.

The mean falling height was 90 cm.

The ball indentation hardness of the plates, measured according to DIN 53 456 at a load of 50 kp, a ball diameter of 5 mm and a measuring time of 10 seconds, was 1885 kp/cm².

The E-module, obtained from the bending test corresponding to DIN 53 452, measured at a standard test bar was 35,900 kp/cm². Comparison Example to Example 1

Under similar conditions, five polyamide samples were prepared from 831 grams of isophthalic acid, 831 grams of terephthalic acid, 1380 grams of meta-xylylene diamine and 300 ml of water each. The five samples were mixed and reduced to small pieces to yield 2.3 kg of polyamide with a mean reduced specific viscosity of 1.88 dl/g. The second order transition temperature was 174° C.

The material was processed as described above and tested. The mean falling height was 20 cm.

Example 2

A polyamide was prepared according to the process described in Example 1 from 141.1 g of terephthalic acid, 24.9 g of isophthalic acid, 43.0 g of adipic acid, 139.0 g of metaxylylene diamine and 34.9 g of hexamethylene diamine. The product obtained had a reduced specific viscosity of 1.79 dl/g. The second order transition temperature of the product was 141° C.

The E-modulus was 44 000 kp/cm².

Example 3

A polyamide was prepared according to the process described in Example 1 from 199 g of isophthalic acid, 93 g of 4,4'-diphenylsulfone-dicarboxylic acid, 46 g of 1,10-decanedicarboxylic acid, 138 g of meta-xylene diamine and 142 g of 1,12-diaminododecane. The product obtained was transparent and had a reduced specific viscosity of 1.63 dl/g. The second order transition temperature of the product was 115° C.

Example 4

A mixture of 705.5 g of terephthalic acid, 124.5 g of isophthalic acid, 215.0 g of adipic acid, 695 g of m-xylylene diamine, 174.5 g of hexamethylene diamine and 180 ml of water was introduced into an autoclave made of stainless steel, the atmospheric oxygen was replaced by nitrogen, the autoclave was sealed and heated to 220° C in the course of 1½ hours. At the same time the pressure had risen to 11 kg/cm². In the course of half an hour the temperature was increased to 245° C while keeping the pressure constant by allowing some water vapor to escape. The pressure was then reduced to atmospheric pressure in the course of half an hour, and at the same time the temperature was increased to 280° C. At this temperature the reaction mixture was stirred in a current of nitrogen for 45 minutes. A transparent polyamide was obtained.

A test bar (0.4 cm × 0.6 cm × 5 cm) was prepared from the polyamide by injection moulding with a screw extruder. The temperatures of the three heating zones of the extruder were 290° C, 280° C and 280° C. The temperatures of the extrusion die and mould were 280° C and 40° C, respectively. The injection pressure was 50 atmospheres gauge.

The test bar was placed with one of the planes measuring 0.6 cm × 5 cm on two edges located in a distance of 3 cm from each other. Halfway between the edges a hanging weight of 500 g was applied to the test bar. After 5 hours at ambient temperature the test bar showed no visible bend. The whole device was then stored in a drying oven, the interior of which was uniformly heated to 110° C. After 5 hours the test bar showed a bend of only ½ mm.

Comparison Example 4a (according to U.S. Pat. No. 3,426,001; Example 2)

A mixture of 111.0 g of 5-t-butyl-isophthalic acid, 658.0 g of adipic acid, 69.5 g of m-xylylene diamine, 522.0 g of hexamethylene diamine and 150 ml of water was polycondensed in the manner described in example 4 to yield a transparent polyamide.

A test bar (0.4 cm × 0.6 cm × 5 cm) was prepared from the polyamide by injection moulding and examined as described in Example 4. After 5 hours at ambient temperature the test bar showed no visible bend. The examination at 110° C could not be carried out on account of the test bar having been bent under the load of 500 g to such an extent that it fell from the edges.

Comparison Example 4b (according to U.S. Pat. No. 3,426,001; Example 3)

A mixture of 222.0 g of 5-t-butyl-isophthalic acid, 584.0 g of adipic acid, 136.2 g of m-xylylene diamine, 466.0 g of hexamethylene diamine and 150 ml of water was polycondensed in the manner described in Example 4 to yield a transparent polyamide.

A test bar (0.4 cm × 0.6 cm × 5 cm) was prepared from the polyamide by injection moulding and examined as described in Example 4. After 5 hours at ambient temperature the test bar showed no visible bend. The examination at 110° C could not be carried out on account of the test bar having been bent under the load of 500 g to such an extent that it fell from the edges.

Comparison Example 4c (according to U.S. Pat. No. 3,426,001; Example 4)

A mixture of 333.0 g of 5-t-butyl-isophthalic acid, 511.0 g of adipic acid, 204 g of m-xylylene diamine and 150 ml of water was polycondensed in the manner described in Example 4 to yield a transparent polyamide.

A test bar (0.4 cm × 0.6 cm × 5 cm) was prepared from the polyamide by injection moulding and examined as described in Example 4. After 5 hours at ambient temperature the test bar showed no visible bend. The examination at 110° C could not be carried out on account of the test bar having been bent under the load of 500 g to such an extent that it fell from the edges.

We claim:

1. A polyamide having improved form stability at elevated temperature, said polyamide being of the general formula $$R_3 \text{---} (HN\text{---}R_1\text{---}NH\text{---}CO\text{---}R_2\text{---}CO)_n\text{---} R_4$$

in which
$R_1$ represents meta-xylylene units, para-xylylene units in an amount of from 0 to 50 mol % of the meta-xylylene units, and at least one, straight-chain bivalent aliphatic hydrocarbon unit containing from 4 to 20 carbon atoms, said meta-xylylene, para-xylylene and bivalent aliphatic hydrocarbon units being randomly distributed in the macromolecule and the proportion of the aliphatic hydrocarbon units being from 5 to 90 mol %, based on the sum of the xylylene and aliphatic hydrocarbon units, $R_2$ represents phenylene units selected from the group consisting of p—$C_6H_4$—, m—$C_6H_4$—, and mixtures thereof, and at least one bivalent aliphatic saturated hydrocarbon unit containing from 3 to 18 carbon atoms; said phenylene and aliphatic hydrocarbon units being randomly distributed over the macromolecule and the proportion of aliphatic units being from 10 to 90 mol %, based on the sum of the phenylene and aliphatic units, $R_3$ represents H or OC—$R_2$—COOH and $R_4$ represents OH or NH—$R_1$—$NH_2$, and in which $x$ indicates the degree of polymerization, measured as reduced specific viscosity within range of from 1.0 to 2.5 dl/g, determined in a solution of 1 g of the polyamide in 100 ml of a mixture of phenol/tetrachloroethane in a weight ratio of 60:40 at 25° C.

2. A polyamide of the general formula of claim 1, wherein the proportion of the aliphatic hydrocarbon units represented by $R_1$ is from 15 to 50 mol %, based on the sum of xylylene and aliphatic hydrocarbon units.

3. A polyamide as claimed in claim 1, wherein the proportion of para-xylylene units represented by $R_1$ is from 0 to 35 mol % of the meta-xylylene units.

4. A polyamide as claimed in claim 1, wherein the straight-chain, bivalent aliphatic hydrocarbon units represented by $R_1$ contain 6 to 12 carbon atoms.

5. A polyamide as claimed in claim 1, wherein the proportion of the aliphatic units represented by $R_2$ is from 30 to 70 mol %, based on the sum of the phenylene and aliphatic units represented by $R_2$.

6. A polyamide as claimed in claim 1, wherein the bivalent aliphatic saturated hydrocarbon units represented by $R_2$ contain 4 to 10 carbon atoms.

7. A polyamide as claimed in claim 1, wherein $R_1$ represents meta-xylylene units, from 0 to 50 mol % of the metaxylylene units of para-xylyene units and —$(CH_2)_6$— units, and $R_2$ represents phenylene units selected from the group consisting of p—$C_6H_4$—, m—$C_6H_4$— and mixtures thereof, and —$(CH_2)_4$-units, all of said units being randomly distributed over the macromolecule.

8. A polyamide as claimed in claim 1, wherein $x$ indicates the degree of polymerization, measured as a reduced specific viscosity of from 1.5 to 2.0 dl/g, determined in a solution of 1 g of the polyamide in 100 ml of a mixture of phenol/tetrachloroethane in a weight ratio of 60:40 at 25° C.

9. A moulded article selected from the group consisting of a sheet, a plate, a tube and an injection moulded technical part prepared from the polyamide of claim 1.

* * * * *